United States Patent [19]

Grimmell et al.

[11] 4,371,783
[45] Feb. 1, 1983

[54] MULTICHANNEL FIBER OPTIC LIGHT GUIDE FOR CAPSULE INSPECTION

[75] Inventors: William C. Grimmell, Lake Hiawatha; Gilbert C. Kaetzel, Wayne, both of N.J.

[73] Assignee: Hoffmann-La Roche Inc., Nutley, N.J.

[21] Appl. No.: 203,290

[22] Filed: Nov. 3, 1980

[51] Int. Cl.³ ................................................. G02B 5/14
[52] U.S. Cl. ..................................... 250/227; 250/226
[58] Field of Search ............................. 250/226, 227; 350/96.24, 96.25; 209/580, 581, 582; 356/405, 406, 407

[56] References Cited

U.S. PATENT DOCUMENTS

| | | |
|---|---|---|
| 3,709,612 | 1/1973 | Clemens ............................. 250/227 |
| 3,771,325 | 11/1973 | Sweeney et al. .................... 250/227 |
| 3,996,494 | 12/1976 | Suga ..................................... 250/227 |
| 4,053,764 | 10/1977 | Sierak et al. ........................ 250/227 |
| 4,054,389 | 10/1977 | Owen .................................. 356/189 |
| 4,212,516 | 7/1980 | Sawamura ....................... 350/96.24 |
| 4,225,230 | 9/1980 | Dostoomian et al. ............. 356/407 |

*Primary Examiner*—David C. Nelms
*Attorney, Agent, or Firm*—Jon S. Saxe; Bernard S. Leon; George W. Johnston

[57] ABSTRACT

According to the broader aspects of the invention, there is provided an improved arrangement which reduces the effort required in aligning optical sensors in optical heads under which capsules are transported and which decreases the relative time variances among certain signals utilized in the evaluation of capsules, most notably those dealing with color recognition and defect detection.

5 Claims, 7 Drawing Figures

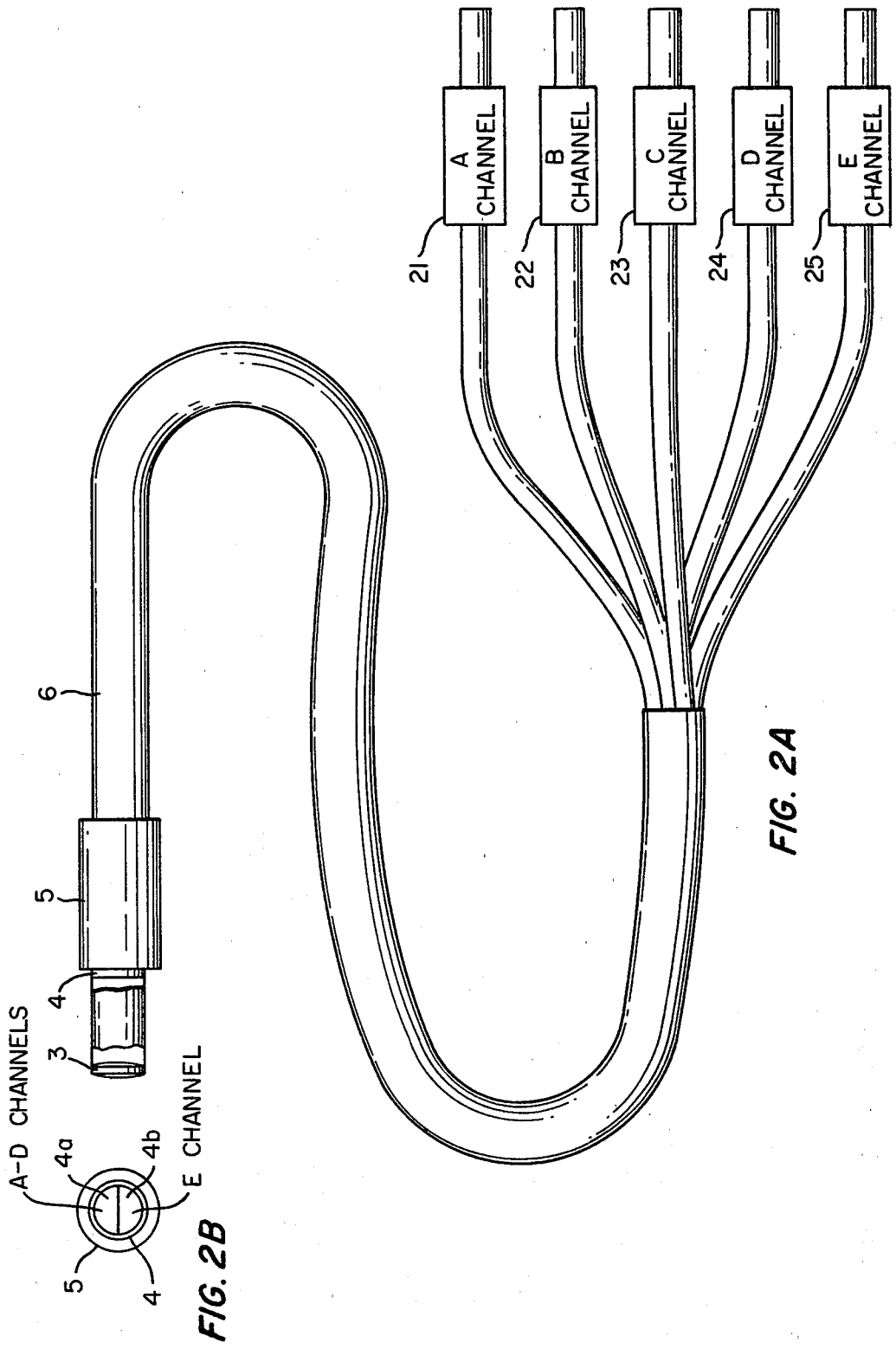

MULTICHANNEL FIBER OPTIC LIGHT GUIDE FOR CAPSULE INSPECTION

BACKGROUND OF THE INVENTION

This invention relates to an optical electronic arrangement for the color recognition and defect detection of medicinal capsules, and more particularly, relates to an improved arrangement in the electro-optics sub-system of the system disclosed in commonly-assigned U.S. Pat. No. 4,143,770, issued Mar. 13, 1979, the subject matter of which, insofar as it is pertinent to the present invention, is incorporated herein by reference.

The capsule inspection system of the aforementioned patent contemplates an electro-optic sub-system which involves a relatively lengthy alignment procedure. One aspect of this procedure is the necessity of aligning a relatively large number of sensors relative to each other. Alignment time can become costly and increases the efforts needed in maintaining the system. Moreover, any relative alignment errors between sensors tend to degrade the system's sensitivity.

It would thus be desirable to provide an arrangement which reduces the number of alignment steps necessary and which also reduces the relative time variances of signals used in capsule evaluation, and such are principal objects of this invention.

In accordance with the invention, light reflected from a capsule surface is passed through a single lens system onto a multi-aperture mask mounted in front of the common termination of a multichannel fiber optic light guide. Signals from the various channels are passed to individual photodetectors which may be preceded by optical filters. The fibers of the individual channels are arranged in a specified manner relative to the multi-aperture mask at the common termination of the guide. The arrangement is such that the multiple channels may be divided into sets. Channels common to a set transmit essentially equal signals to their respective photodetector filter pairs. The signals in each set are such that they eccentuate certain capsule features. The eccentuated features differ from set to set.

Such an arrangement not only reduces the difficulties in the alignment of optical heads, it enables a reduction in the size of such heads and increases the accuracy of the relative alignment of optical channels. Similar to the concept embodied in the aforementioned reference patent, this invention contemplates four color recognition channels, each being associated with a different portion of the light spectrum, as well as a further channel dedicated to capsule defect detection. However, unlike the concept embodied in the aforementioned reference and patent, this invention contemplates that the four color recognition channels, as well as the defect channel will be derived from a single rather than multiple number of sensors. Preferably three such optical sensor arrangements would be associated to the sensor head, thus providing corresponding selected different views of the inspected object.

BRIEF DESCRIPTION OF THE DRAWINGS

The above objects and features will become better understood with reference to the following detailed description taken in conjunction with the accompanying drawings, in which:

FIG. 2A in a largely schematic view, illustrates the fiber optic guide arrangement according to the invention;

FIG. 2B is an end view of the sensor end of the arrangement of FIG. 2A;

DESCRIPTION OF THE PREFERRED EMBODIMENT(S)

Figure 1:
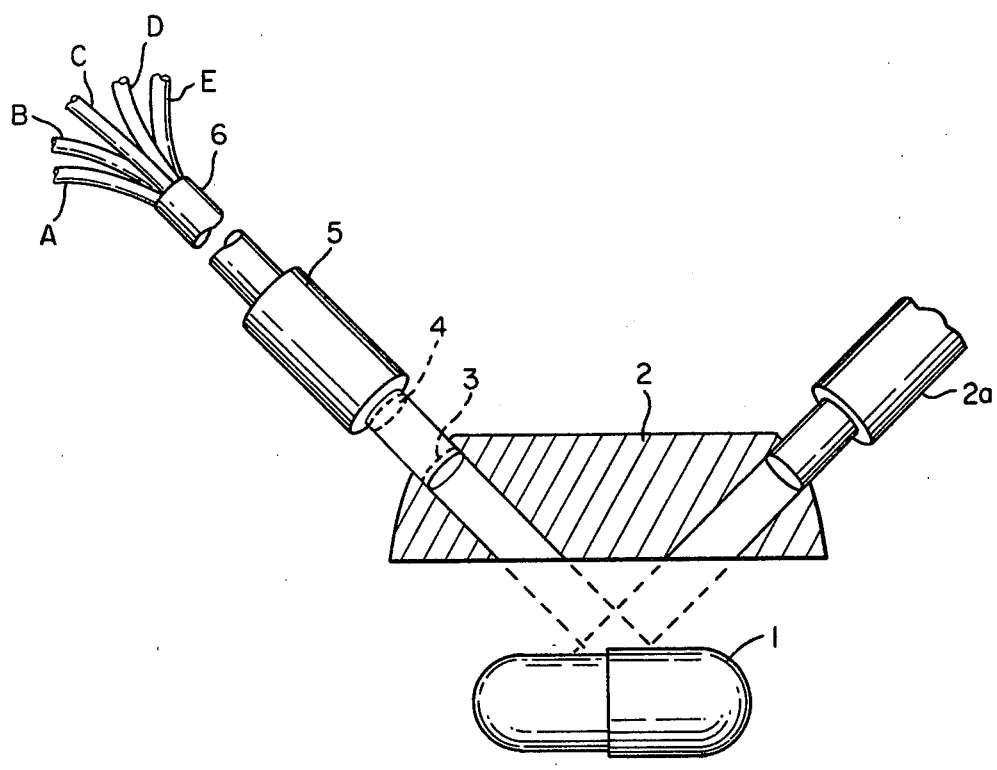
FIG. 1 diagrammatically illustrates the transport of a capsule under an optical head in accordance with the priciples of the present invention.

Referring to FIG. 1, an object 1, such as a multi-colored medicinal capsule, when passing beneath an optical head 2, is illuminated by a light source 2a and viewed by a sensor system comprising a lens 3, and a multi-aperture mask 4. The light gathered by the lens 3 and passing through the mask 4 enters the common end 5 of a multichannel fiber-optic light guide 6.

Various branches of the guide 6 as depicted in FIG. 1 are identified individually as A, B, C, D and E. In the example herein depicted, the four channels A-D are associated with color recognition and the E channel is associated to capsule defect detection and operates preferably in the infra-red spectrum.

The above described arrangement is more particularly illustrated in FIG. 2. The common end 5 of the sensor arrangement begins with the lens 3, shown in FIG. 2A in a partial breakaway view. The light passing through lens 3 impinges on the mask 4, also illustrated via a partial breakaway view. The end view of FIG. 2B shows that the mask 4 is actually divided into upper and lower parts, as will become more apparent with regard to FIG. 3A. The upper portion 4a is associated with channels A-D (i.e. the color recognition channels) of the fiber optic guide and the lower is associated to channel E (i.e. defect detection).

The individual fibers of the guide 6 leading from the common end 5 are gathered into five bundles or channels A-E, each of which terminates in a connector 21-25 leading to the remainder of the system.

Figure 3A:
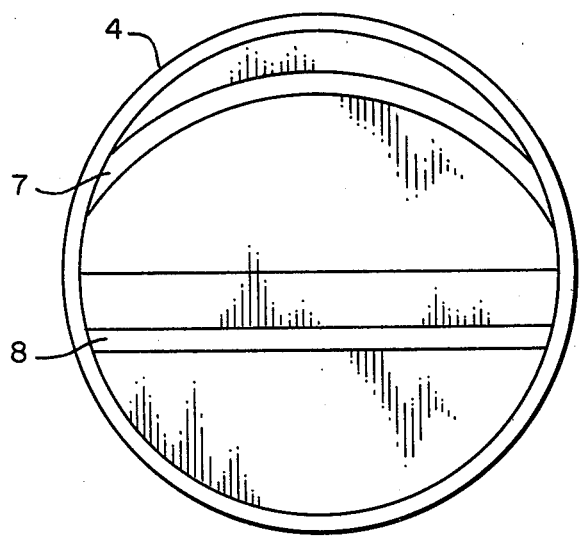
FIGS. 3A and 3B respectively illustrate the mask employed by the optical system of the invention in an enlarged front view together with corresponding viewing areas on the capsule surface which relate to the apertures provided in the mask.
Figure 3B:
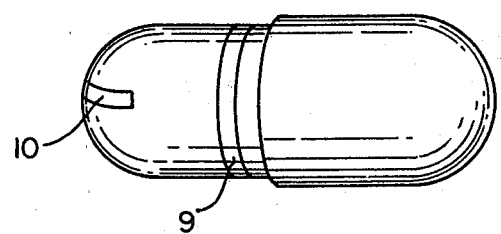

FIG. 3A illustrates more particularly the face of the optical mask 4 utilized in the sensor arrangement. In the preferred embodiment, the multi-aperture mask 4 defines a pair of slits, a transparent elliptical slit 7 in the upper portion and a transparent linear slit 8 in the lower portion, with the rest of the mask being opaque. The great advantage and effect of such a masking arrangement is that at any time light passing through the elliptical slit 7 is reflected from a narrow region 9 (FIG. 3B) of the cylindrically shaped viewed object 1 and light passing through the linear slit 8 originates from another narrow region 10 of the viewed object. These narrow regions 9 and 10 of the object under view are dependent upon the position of the object relative to the optical head.

Figure 4:
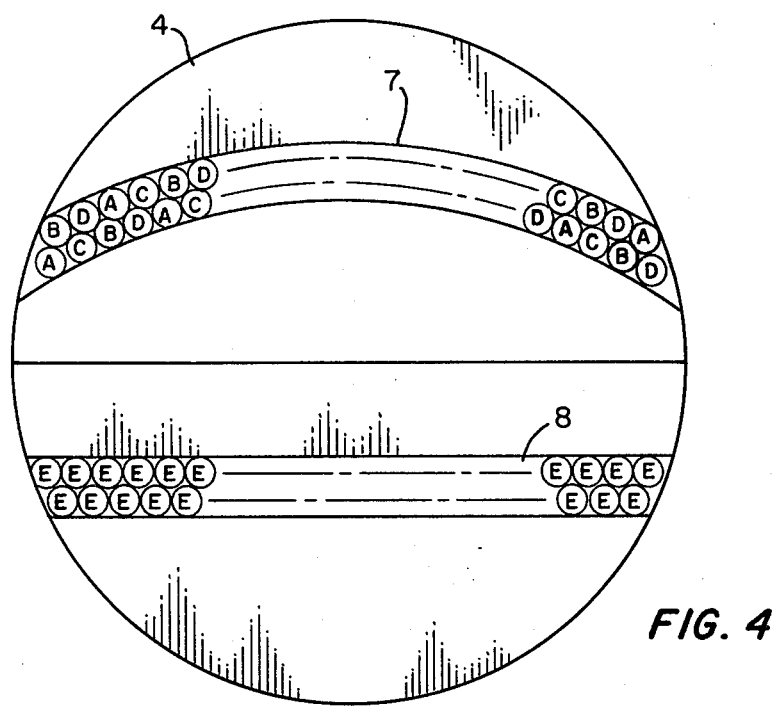
FIG. 4 illustrates in an enlarged diagrammatic view the relationship between the individual fibers of the fiber optic guide relative to the slits or apertures of the mask employed in the optical sub-system.

FIG. 4 illustrates the arrangement of the individual fibers of the optical wave guide relative to the elliptical and linear slits 7 and 8 of mask 4. In this figure the encircled letters A-D associated to the elliptical slit 7 correspond to the channels A-D respectively. As shown, the active fibers of channels A, B, C and D terminate in the region of common end 5 which receives light passed through the elliptical slit 7 of the multi-aperture mask 4. In each of these channels active fibers are distributed essentially evenly over this region. The effect of such uniform distribution is that the light transmitted by each of the channels A-D is essentially from the identical region of the viewed object.

Active fibers from or associated to channel E are distributed uniformly over the region of the multichannel guide 6 which receives light passing through the linear slit 8 of the multi-aperture mask 4.

Figure 5:
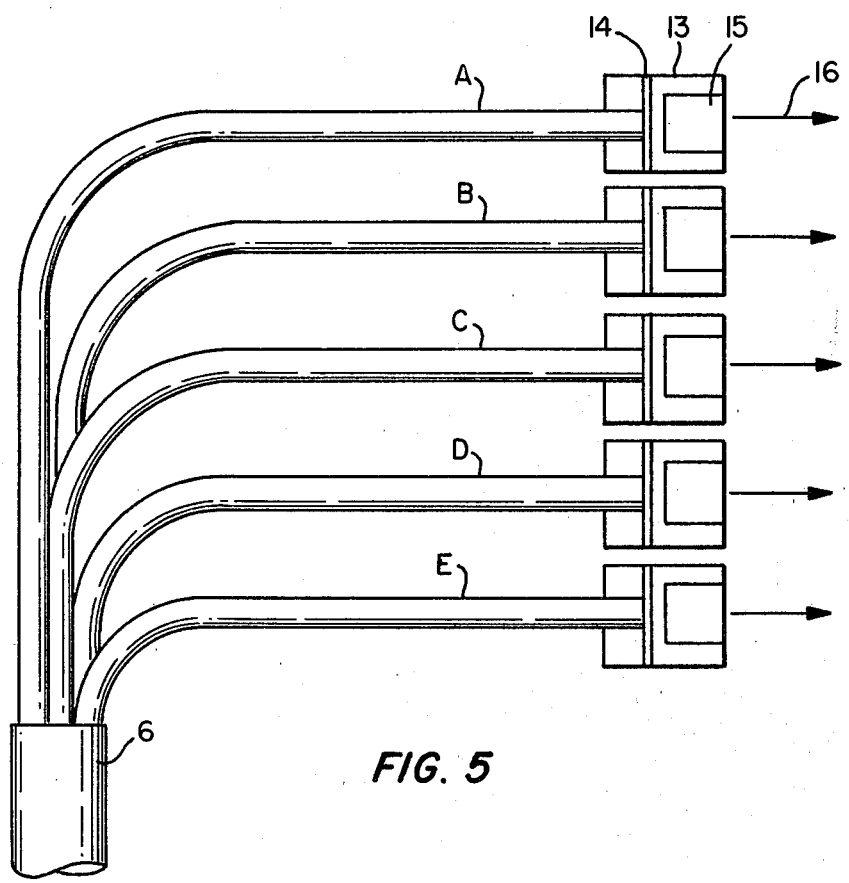
FIG. 5 diagrammatically illustrates that portion of the electro-optical sub-system wherein the light signals are converted to electrical energy.

FIG. 5 illustrates diagrammatically the branching of the fiber optic wave guide 6 into its individual channels A-E as they each lead to an individual arrangement for converting the light signals into electrical signals. In FIG. 5, the ends of the channels of the multichannel fiber optic guide 6 terminate in individual photodetector housings 13. The light from an individual channel passes through an optical filter 14 (or no filter as in the case of channel E) and then impinges upon a photodetector 15. The photodetector converts the light it receives to an electrical signal which is output on line 16, there to be forwarded to further electronic processing circuitry.

In the preferred embodiment, optical filters 14 covering different regions of the visible spectrum are inserted into the photodetector housings associated to channels A-D. Thus the set of electrical signals generated by the photodetectors receiving light from channels A-D may be thought of as a color vector representing the color of the region of the viewed object which transmits light through the elliptical slit 7 of the multi-aperture mask 4.

No careful alignment of the sensor system is necessary to assure that the outputs of the detectors result from light from the same region of the viewed objects, since the use of a single-sensor channel and the uniform distribution of the channel's active fibers ensures that the outputs result from light from an identical region. In addition to the generation of color vectors via channels A-D, the preferred embodiment provides a signal resulting from light transmitted via channel E whose time history provides a sensitive indication of the curvature of the viewed object in unobstructed planes parallel to the objects direction of travel.

What is claimed is:

1. A fiber optic arrangement for detecting certain properties of a capsule by utilizing focussed light reflected from the capsule comprising:
   (a) a fiber optic guide having a plurality of channels of optical fibers joined together at an end to form a common end and the other end of each channel being free, said common end being positioned to receive the focussed reflected light from the capsule, and the optical fibers of each channel being substantially evenly distributed over the common end;
   (b) mask means covering the common end of the channels for masking a portion of the light reflected from the capsule and having a first aperature with a curved configuration located and dimensioned to permit only light reflected from a predetermined section of the capsule to pass to the channels;
   (c) detecting means associated with the free end of the channels for obtaining a plurality of electrical signals from the light passing through channels and detecting the color of the capsule, the signals representing the response of the capsule to the light.

2. The arrangement of claim 1 wherein the first aperature has an eliptical configuration.

3. The arrangement of claim 2 wherein the mask means is a mask.

4. The arrangement of claim 2 wherein the mask means has a second aperature having a linear configuration located and dimensioned to permit only light reflected from another predetermined section of the capsule to pass therethrough; and further comprising:
   (a) at least one additional channel of optical fibers having an end communicating with said second aperature to receive the light passing through the second aperature, said additional channel also having a free end;
   (b) additional detecting means associated with the free end of said additional channel for obtaining an electrical signal from the light passing through the additional channel and for detecting the shape of the capsule.

5. The arrangement of claim 4 wherein said additional detecting means operates in the infra-red radiation spectrum.

* * * * *